United States Defensive Publication [19] (H) [11] T991,002
Leonard [43] Mar. 4, 1980

[54] COATING COMPOSITION

[76] Inventor: Don R. Leonard, Rte. 15, 421 Old Castle Rd., Kingsport, Tenn. 37660

[21] Appl. No.: 13,112

[22] Filed: Feb. 21, 1979

[51] Int. Cl.[2] ..... C08L 1/14
[52] U.S. Cl. ..... 260/15; 428/481; 428/528

[57] ABSTRACT

Disclosed are aqueous emulsion coating compositions comprising a thermosetting polyester resin, cellulose ester, melamine-formaldehyde crosslinking agent, a combination surfactant-curing agent and a suitable organic solvent. The cellulose ester is preferably cellulose acetate butyrate. The combination surfactant-curing agent is preferably ammonia- or amine-neutralized salts of sulfonated, ethoxylated hydrocarbons. The concentrate is emulsified in water and used as a coating composition. The coating has low solvent emission to the atmosphere when drying, provides a hard but flexible coating having excellent appearance, good durability, and rapid drying properties.

9 Claims, No Sheets Drawing,

9 Pages Specification

The file of this unexamined application may be inspected and copies thereof may be purchased (849 O.G. 1221, Apr. 9, 1968).